(12) United States Patent
Markandey et al.

(10) Patent No.: US 6,320,620 B1
(45) Date of Patent: Nov. 20, 2001

(54) LOW COST PROGRESSIVE SCAN TELEVISION WITH SPECIAL FEATURES

(75) Inventors: Vishal Markandey; Todd A. Clatanoff, both of Dallas; Kazuhiro Ohara, Plano; Akira Takeda, Dallas, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 1004 days.

(21) Appl. No.: 08/635,449

(22) Filed: Apr. 19, 1996

Related U.S. Application Data

(63) Continuation of application No. 08/430,774, filed on Apr. 27, 1995.

(51) Int. Cl.[7] ............................. H04N 7/01; H04N 11/20
(52) U.S. Cl. ................................. 348/448; 348/452
(58) Field of Search ........................ 348/448, 451, 348/452, 458, 459, 755, 764, 771, 770, 441; H04N 7/01, 11/02

(56) References Cited

U.S. PATENT DOCUMENTS

| 4,215,397 | | 7/1980 | Hom . | |
|---|---|---|---|---|
| 5,027,201 | * | 6/1991 | Bernard | 348/452 |
| 5,051,826 | * | 9/1991 | Ishii et al. | 348/448 |
| 5,192,946 | * | 3/1993 | Thompson et al. | 348/764 |
| 5,260,786 | * | 11/1993 | Kawashima et al. | 348/452 |
| 5,291,280 | * | 3/1994 | Faroudja et al. | 348/452 |
| 5,386,237 | * | 1/1995 | Knee | 348/448 |
| 5,398,071 | | 3/1995 | Gove et al. . | |

FOREIGN PATENT DOCUMENTS

| 0 415 325 A3 | 3/1991 | (EP) . |
|---|---|---|
| 0 444 947 A3 | 9/1991 | (EP) . |

OTHER PUBLICATIONS

Vishal Markandey, et al., "Motion Adaptive Deinterlacer for DMD (Digital Micromirror Device) Based Digital Television," *IEEE Transactions On Consumer Electronics*, vol. 40, No. 3, Aug. 1994, pp. 735–741.

Gove, et al., "High Definition Display System Based On Degital Micromirror Device", Oct. 26–28, 1994.

Markandey, et al., "Motion Adaptive Deinterlacer for DMD (Digital Micromirror Device) Based Degital Television", Jun. 21–23, 1994.

\* cited by examiner

*Primary Examiner*—Michael H. Lee
(74) *Attorney, Agent, or Firm*—Charles A. Brill; Wade James Brady, III; Frederick J. Telecky, Jr.

(57) ABSTRACT

A television system (10) with interlaced to progressive scan conversion. The system receives interlaced television signals then converts them to progressively scanned data using either field differencing, enhanced field differencing, frame differencing or other temporal processing depending upon which implementation is used. The implementations used depend upon which configuration of the system (10) was purchased, and can be changed with an upgrade to the more expensive implementations.

6 Claims, 5 Drawing Sheets

LOW COST PROGRESSIVE SCAN TELEVISION WITH SPECIAL FEATURES

RELATED APPLICATIONS

This application is a continuation of Ser. No. 08/430,774 filed Apr. 27, 1995.

This application is concurrently filed with U.S. patent Ser. No. 08/429,254, filed Apr. 25, 1995, titled "FILM MODE PROGRESSIVE SCAN CONVERSION."

BACKGROUND OF THE INVENTION

1. Field of the Invention

The invention relates to television systems, more particularly for progressively scanned, digital televisions.

2. Background of the Invention

Broadcast television signals typically arrive at the receiver in interlaced format. That is, each video frame to be displayed arrives as two fields. The first field contains either the even-numbered lines or the odd-numbered lines. The second field contains the opposite set of lines.

The television displays the frames such that the viewer cannot really tell that they are two fields. However, recent innovations in the broadcast television area have started to do progressive scanning. In progressive scanning (proscan), the interlaced fields are combined before display, and the entire frame is displayed. In a cathode-ray tube (CRT) television, this means that the electron gun or guns that scan the picture do so with the entire frame of data rather than scanning either the even or odd lines first, then following with the opposite lines.

In some embodiments of television systems, no CRT is used. These televisions use arrays of individually controllable elements, such as liquid crystal devices, or digital micromirror devices. etc. (LCDs or DMDs, respectively). Because there is no scanning gun in these systems, they will typically have to de-interlace the fields before display, then put the entire frame onto the activation circuitry for the array of individual elements.

This can cause problems by raising the system cost and requiring higher level circuitry to perform these functions. Without the ability to implement proscan, however, the other advantages of using spatial light modulators, including completely digital television (digital from input to output) and sharper pictures with better resolution, become overshadowed by the high cost.

A method is needed, therefore, to allow system using spatial light modulators to convert from interlaced to proscan without a sharp increase in the system cost.

SUMMARY OF THE INVENTION

A television system that receives interlaced signals is disclosed. The system receives the interlaced signals then converts them to progressively scanned data using one of several processing methods, depending upon the configuration of the system purchased. The configurations vary in cost, but can be easily upgraded to include the more expensive processing methods.

It is an advantage of the system in that if offers one system to a wide range of purchasers, making manufacture simpler yet can reach more consumers.

It is an advantage of the system in that it includes all of the necessary processing power to implement the more complex methods of interlaced to progressive scan conversion, thereby making upgrades easier to install.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
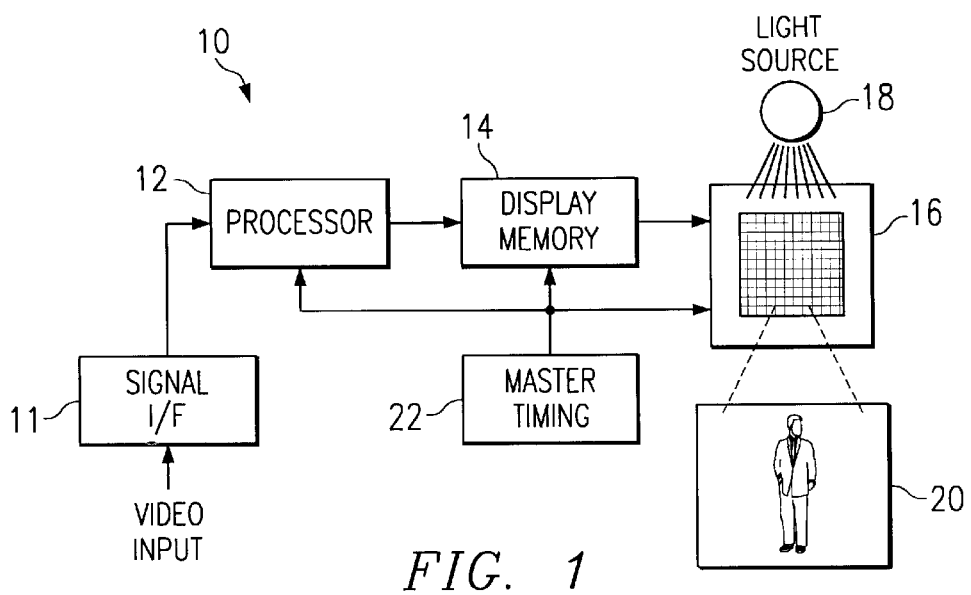
FIG. 1 shows a block diagram of a television system using spatial light modulators.

A television receiver that converts from the current standard of analog television transmission to digital signals is shown in FIG. 1. The requirement of analog to digital (A/D) conversion is not necessary for the operation of the invention. In some manner, however, a digital signal must be produced. The incoming interlaced video signal comes into the receiver at signal interface (I/F) 11. At this point, if the incoming signal is not already digital, it is digitized by A/D conversion.

The current invention can be utilized either before or after the incoming signal undergoes color space conversion. The interlace to progressive scan (proscan) conversion can either be performed on the chrominance and luminance (C and Y) components of the signal, or on the red-green-blue (RGB) converted signal. The color space conversion may occur either in the signal interface unit 11 or the processor 12 of receiver 10 in FIG. 1.

The interlace to proscan conversion would most likely be performed in the processor 12, although it could be accomplished in the interface unit 11 if so desired. Regardless of where the conversion takes place, the converted signal, after undergoing any other processing that may be desired, is sent to a display memory 14. The master timing unit 22 controls the timing of the signals between the processor and the memory and between the memory and the spatial light modulator 16.

Spatial light modulator 16 consists of an x-y array of individually controllable elements. Each element has some type of activation circuitry which causes the individual element to affect the light from light source 18 in response to a signal stored in memory 14. The cumulative effect of each array of elements responding to signals transmitted from the memory forms an image, which, after undergoing magnification would appear like image 20. Examples of spatial light modulators include liquid crystal devices, and digital micromirror devices, etc.

The above description of the system in which the proscan conversion process is accomplished is not intended to be exclusive of other possible combinations of system elements. It merely serves as an example.

Unlike conventional (such as CRT) monitors, spatial light modulators do not use CRT guns to scan the picture. Instead, they display an entire frame of data at any one time, and therefore, the incoming interlaced fields must be merged to create one frame. Under typical standards such as NTSC, and PAL, the incoming frame comes in two fields. In NTSC for example, the first field contains the even-numbered lines and the second field contains the odd-numbered lines for the same frame. In order to display this upon the face of a spatial light modulator, the data must be merged into one frame of data, stored in memory and sent to the modulator's activation circuitry at the same time.

The addition of this circuitry can significantly increase the price of televisions using spatial light modulators. However, FIGS. 2–5 show several embodiments of the current invention that allow for proscan conversion and require minimum amount of circuitry.

Figure 6:
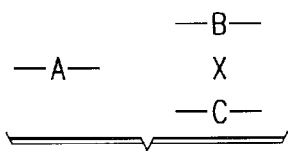
FIG. 6 shows a schematic diagram illustrating the location of the pixels used to perform proscan conversion.
Figure 2:
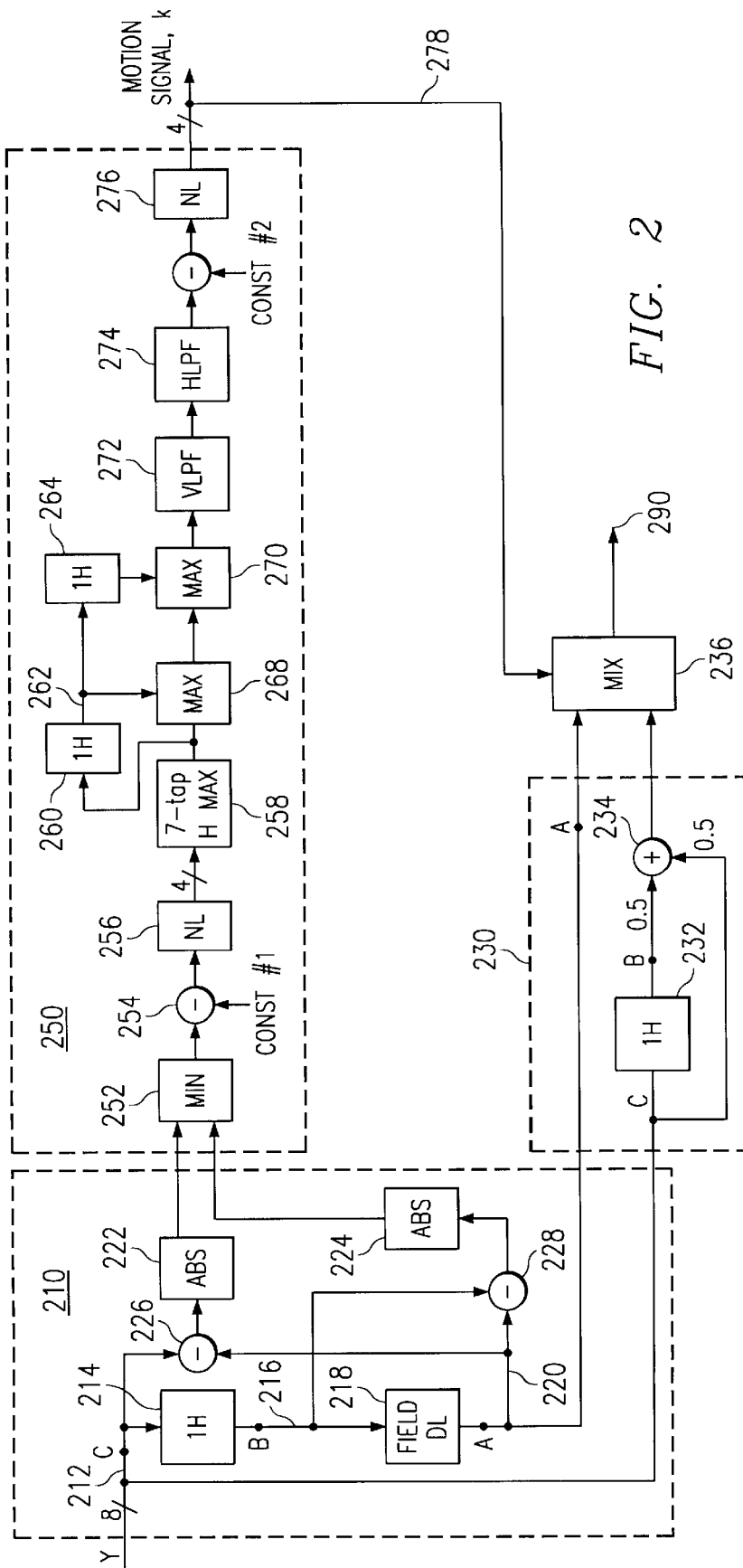
FIG. 2 shows a block diagram of a circuit for implementing a first embodiment of field difference interlaced to progressive scan conversion.

The lowest-priced embodiment of the present invention is shown in FIG. 2. For all of the processes, a defined system of labels will be helpful. Field 1 will be the current field, with Field 0 being the immediately previous field. The pixel the process is trying to produce is pixel X in Field 1, as shown in FIG. 6. The pixels used in this process will be pixel A, which is on the same line as Field 0. Pixels B and C are from Field 1, pixel B is above pixel X, and pixel C is below pixel X.

The first adaptable proscan circuit generally implements finding pixel X by finding the minimum between (A–B) and (A–C). This is accomplished by the circuit shown schematically in FIG. 2. For ease of discussion, the circuit has been broken into three function groups, designated by boxes 210, 230, and 250. The incoming data on line 212 is pixel C. Looking now at function group 210, after the horizontal delay 214, the line carries pixel B. After a field delay, the line 220 carries pixel A. Subtraction of lines 212 (pixel C), and lines 220 (pixel A) is accomplished at 226, and the resulting value is converted to an absolute value at 222. At 228, the substraction of lines 216 (pixel B) and 220 (pixel A) is accomplished. The absolute value is obtained at 224. This output then enters functional group 250.

Figure 7:
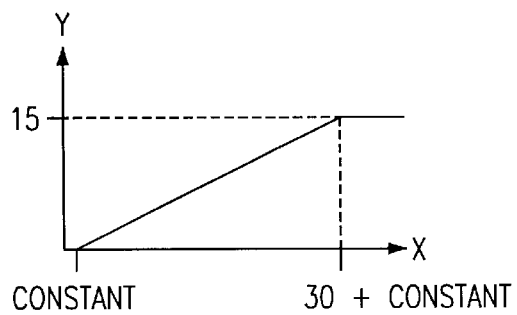
FIG. 7 shows a graphical representation of the thresholding and clipping functions performed by the circuit represented by FIG. 2.

At 252 a comparator or similar circuit element is used to determine the minimum between the two absolute values |A–B| and |A–C|. A constant value depending upon system parameter is then subtracted from the resulting minimum. The value of the constant can be varied, if necessary depending upon system noise characteristics. The non-linear operation performs thresholding to eliminate small difference signal values due to noise. It also reduces the resolution of the difference signal to 4-bits. The functions of removing the constant at 254 and the nonlinearity at 256 can be merged together. The resulting non-linear operation can be shown as illustrated by FIG. 7.

The data then undergoes a determination as to what pixel has the horizontal max, using the 7-tap H MAX filter at 258. The current value of the motion signal at pixel X is compared to 3 pixels on either side of it. Similarly, using the horizontal delays 260 and 264, the pixels on either side of pixel X vertically are compared for determination of the maximum. The first comparison is performed by MAX 268, between the pixel and one of its vertical neighbors. The maximum is then passed to the MAX 270, where it is compared to its other neighbor, from delay 264. The purpose of the MAX function is to expand the detected motion signal to cover areas of non-detection. To avoid erroneous motion detection, the data then passes through horizontal low pass filter (HLPF) 272 and vertical low pass filter (VLPF) 274, respectively.

Another constant is removed from the data, and it undergoes another nonlinearity adjustment at 276. The resultant signal from function group 250 is the motion signal k, on line 278. This data is passed to the mixing circuit 236 is functional group 230. At the other end of the functional group, the values for pixel C on line 212, the value for pixel B out of delay 232, and the value of pixel A from function group 210 are received. Pixels B and C are added together after being multiplied by 0.5. These values are sent to the mixing circuit, which is some type of arithmetic operation circuit and the resultant signal 290 equals $k(C+B)/2+(1-k)A$. This value is the value assigned to pixel X in the proscan conversion.

The above process implemented in a processor, or the function spread over several processors, find the missing pixel X. Repetitions of this process allows the generation of the line between the two lines B and C in Field 1. This in turn allows the system to convert the interlaced input to progressively scanned data for display. The approached discussed above is a field-differencing approach.

Figure 3:
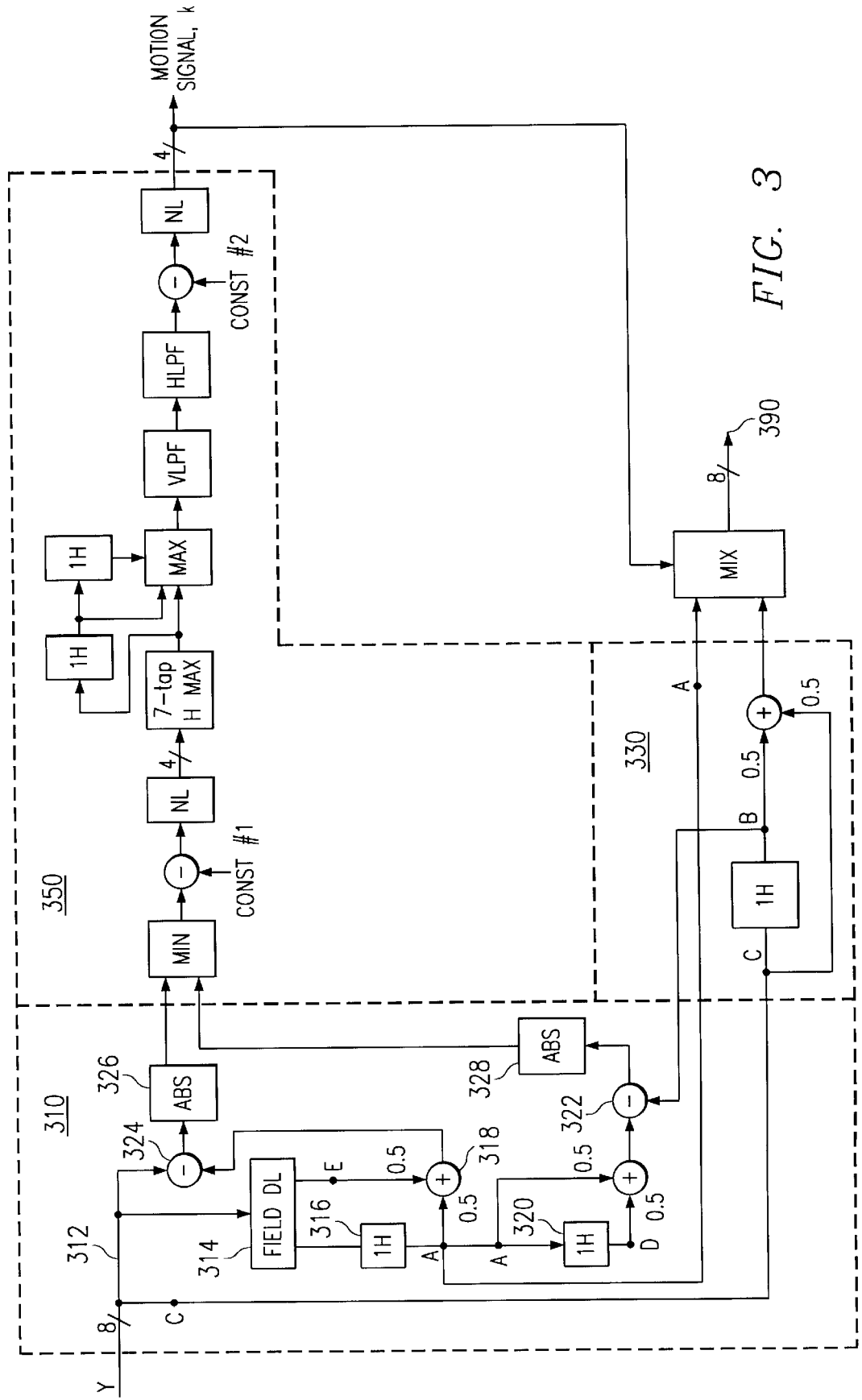
FIG. 3 shows a block diagram of a circuit for implementing a second embodiment of field difference interlaced to progressive scan conversion.
Figure 4:
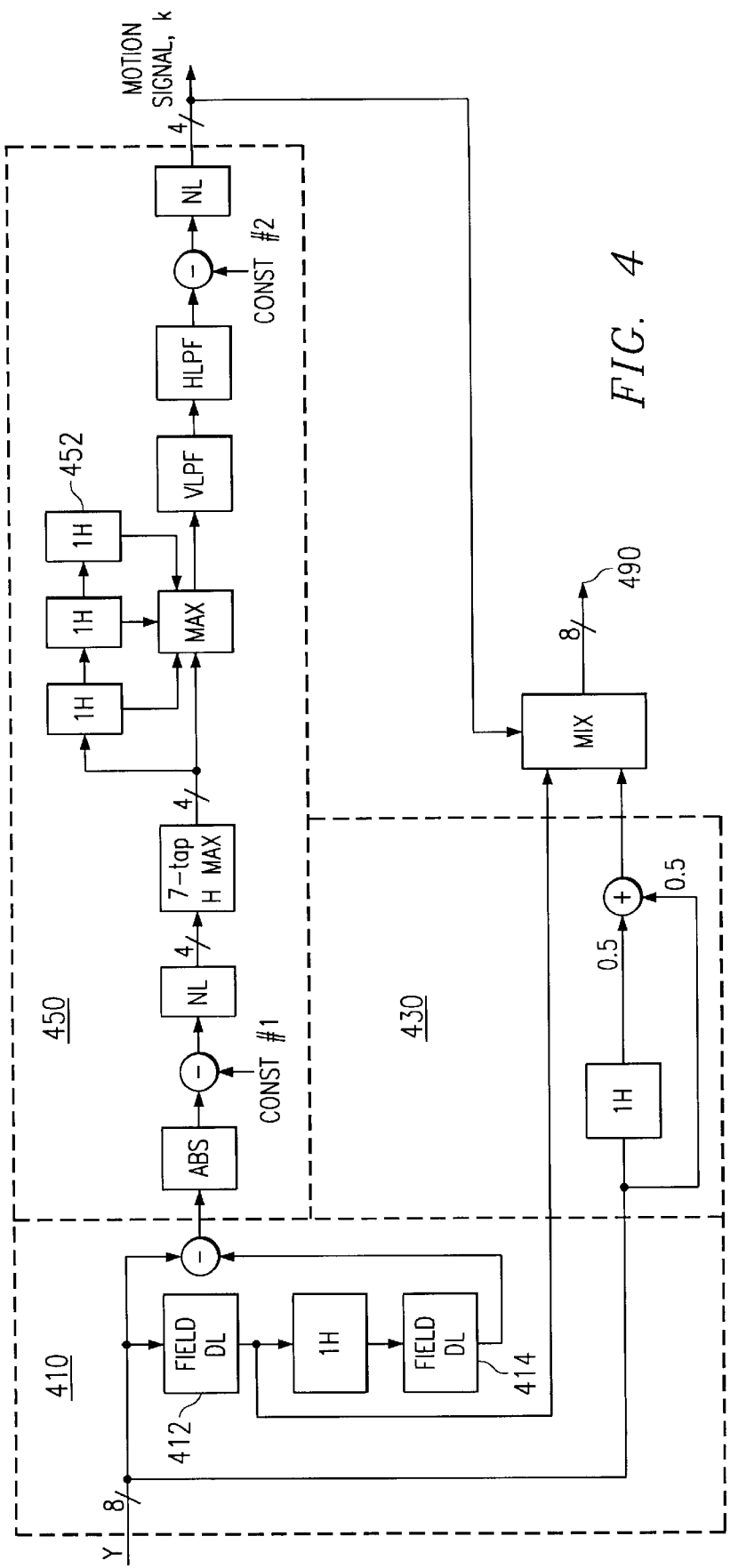
FIG. 4 shows a block diagram of a circuit for implementing a frame difference interlaced to progressive scan conversion.
Figure 5:
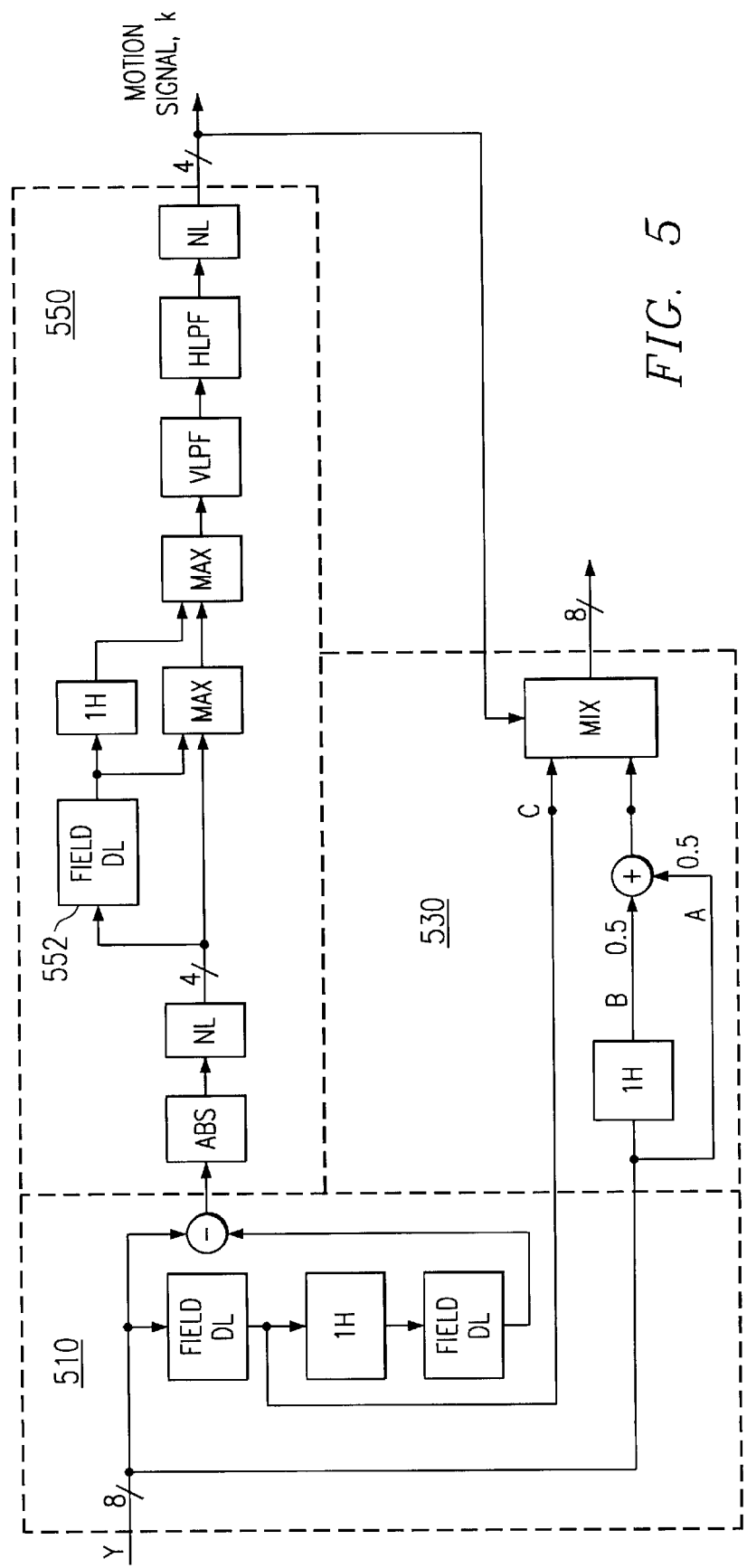
FIG. 5 shows a block diagram of a circuit for implementing a temporally filtered interlaced to progressive scan conversion.

More expensive variations are shown in FIGS. 3–5. The rise in expense comes from the increase in memory or processing power, or both. The circuit elements contained in function group 250 from FIG. 2 are the same in FIG. 3, so that box does not require any discussion relevant to FIG. 3. Functional groups 310 and 330 varies slightly from functional groups 210 and 230 from FIG. 2, respectively.

Figure 8:
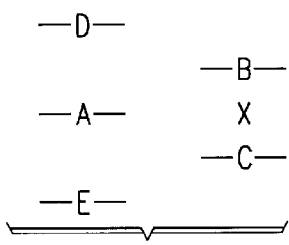
FIG. 8 shows a schematic diagram illustrating the location of pixels used to perform proscan conversion.

The higher cost comes from additional memory necessary in this embodiment. Instead of using only pixels A, B and C, this embodiment also uses pixels D and E. As shown in FIG. 8, pixels D and E are from Field 0, and are the vertical neighbors of pixel A, with pixel D being the above vertical neighbor and pixel E being the below vertical neighbor.

In functional group 310, the incoming data is again that of pixel C. After a field delay 314, the data from the field delay is pixel E. After a one line horizontal delay, the data is pixel A. Pixels A and E are multiplied by 0.5 and added together. The value $(A+E)/2$ is then subtracted from pixel C at 324 and the absolute value taken at 326, resulting in a first value $|C-(A+E)/2|$. Meanwhile, the output of the horizontal delay 316, resulting in pixel A is combined with the output of horizontal delay 320, pixel D. Both values are multiplied by 0.5 before being added together. The value for pixel B subtracts that value, resulting in $(B-(A+D)/2)$. The absolute value of that value is taken resulting in a second value $|B-(A+D)/2|$. The first and second values become the input of the circuitry identical to functional group 250 from FIG. 2.

The added cost of this system results from the memory required for the two additional line delays, but only one additional line memory because of common use of the line memory, applied to Field 0, which allow the use of pixels B and D. The final output of this embodiment is a more exact motion signal k. When the mixing circuit in functional group 330 produces the result, $k(C+B)/2+(1-k)A$, the more precise value for k gives a better approximation of the pixel X. As the circuit performs these functions on every pixel in the missing line, then repeats for every line, the resulting proscan data has better picture quality.

The embodiments of proscan shown in FIGS. 2 and 3 are field difference implementations of proscan, with FIG. 3 giving an example of an enhance field differencing approach. FIG. 4 shows a frame difference implementation. Functional group 410 now has one field delay 412, which allows the storage of the previous field to the current field. It also has another field delay 414, which stores the next most previous field. Above Field 1 had been the current field in which pixel X was sought. In this implementation, Field 2 is the current field. Field 1 is the previous field, and Field 0 is the next most previous field. Since the input is interlaced, with every other line in any given field. Field 0 and Field 2 have the same line numbers in them, either odd or even.

Functional group 410 computes the difference between the pixels positioned the same in each field. For example, if pixel B were pixel 1, line 4, in Field 2, it value would be compared to pixel J, pixel 1, line 4 in Field 0. The frame differences for the two lines on either side of pixel X would be found and sent to the functional group similar to functional group 250 from FIG. 2. The only difference between these circuit elements is the addition of an extra horizontal delay 452. This is necessary because the maximum of four values (the frame differences) is sought. The data resulting from this embodiment on line 490, because of the use of more pixels, would provide even better picture quality.

The resulting data, which uses the same equation from FIGS. 2 and 3, also takes into account the position and value of pixel A, from Field 1. This is necessary because pixel A is at the same position of pixel X. However, additional cost results from the addition of enough memory to allow the retention of two fields of data instead of just one, and the addition of enough memory for the retention of another line of data, for the extra horizontal delay. The higher precision is obtained at a higher system cost.

The most expensive proscan implementation of those shown here is shown in FIG. 5. Functional group 510 is identical to functional group 410. Function group 530 is the same as functional groups 230, 330 and 430. The differences between functional group 450 and functional group 550 start at the extra field delay 552. Additionally, the addition of the constants has been eliminated as has two of the horizontal delay lines. This implementation, which will be referred to as a temporal implementation or approach, uses the previous 2 fields. The current field is now Field 3. The addition of the extra field give more information into the processing circuitry, again resulting in an even higher amount of precision in the approximation of pixel X. However, the additional memory for the retention of yet another field increases the system cost.

All of the above embodiments of proscan perform the necessary function of interlaced-to-progressive-scan conversion. However, additional advantages become more obvious if the system includes options for special features, like pause or freeze. In a typical system in pause mode, for example, the system will redisplay a given field until the viewer desires the system to continue normal display. The use of freeze or pause causes "tears" or jagged edges to the picture. Since most systems use the equation $k(C+B)/2+(1-k)A$ to create the missing field, tears result because the motion signal is zero. The same field is being redisplayed, so there is no motion.

In the above embodiments, because there is at least one previous field already retained, the system can use that field to toggle between the two fields. This eliminates the tearing in the picture displayed.

In the above embodiments of the invention, the ideal system would include the processing capability to allow it to be upgraded. In this manner, when a consumer decides to purchase a set, that consumer could buy the lowest priced set, with the least expensive proscan implementation set out above. Over time, the consumer would have the opportunity to upgrade the system with only the addition of memory and a change in the processor's function, most likely controlled by software. Consumers that can afford the more expensive proscan implementation could purchase the same set with the additional memory and software already installed.

Thus, although there has been described to this point particular embodiments of a variable, modular proscan implementation system, it is not intended that such specific references be considered as limitations upon the scope of this invention except in-so-far as set forth in the following claims.

What is claimed is:

1. A television system which receives interlaced television signals, comprising:
   a receiver for receiving said interlaced signals;
   a processor for converting said signals into progressively scanned data, wherein said processor is operable to use one of several methods of converting said signals such that said processor performs motion detection between at least two fields of video data in any of said several methods;
   memory in communication with said processor for receiving data during and after said conversion, wherein said memory is capable of being expanded to include more memory, wherein said expansion of said memory allows for additional ones of said several methods and said expansion of said memory determines which of said additional methods are allowed; and
   a spatial light modulator for displaying said converted signals as a progressively scanned video image.

2. The system in claim 1 wherein said processor operates on said signals using field differencing.

3. The system in claim 1 wherein said processor operates on said signals using enhanced field differencing.

4. The system in claim 1 wherein said processor operates on said signals using frame differencing, wherein said at least two fields of video data are from different video frames.

5. The system in claim 1 wherein said processor operates temporally on said signals.

6. The system in claim 1 wherein said system is capable to toggle between two fields in a special mode, resulting in a still picture with reduced artifacts.

* * * * *